Figure 1:
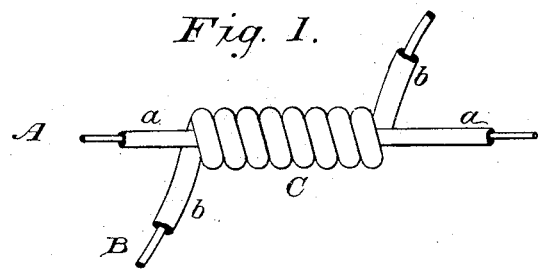

(Model.)

O. LUGO.
Telegraphic Circuit.

No. 240,600.  Patented April 26, 1881.

WITNESSES  
Wm A. Skinkle  
Geo W. Breck

INVENTORS  
Orazio Lugo.  
By his Attorneys  
Baldwin, Hopkins & Peyton

N. PETERS, PHOTO-LITHOGRAPHER, WASHINGTON, D.C.

UNITED STATES PATENT OFFICE.

ORAZIO LUGO, OF NEW YORK, N. Y.

TELEGRAPHIC CIRCUIT.

SPECIFICATION forming part of Letters Patent No. 240,600, dated April 26, 1881.

Application filed February 1, 1881. (Model.)

*To all whom it may concern:*

Be it known that I, ORAZIO LUGO, a citizen of the United States, residing in the city, county, and State of New York, have invented certain new and useful Improvements in Telegraphic Circuits, of which improvements the following is a specification.

My invention relates to electric circuits for telegraphic and telephonic transmission.

It consists in a novel organization of the conductors composing said circuits whereby interference arising from action and reaction upon each other of derived or induced currents is prevented.

Telephonic or telegraphic circuits, as is well known, consist, in part, of a conductor of electricity extending from one station to the other, and insulated from all surrounding conducting bodies, including the earth, the circuit being completed either through the earth or through a return-conductor, which may or may not be insulated from the earth, but must be insulated from the first-mentioned conductor, which forms a part of the same circuit. In overland-lines the conductors are usually suspended at a considerable height above the ground, and are insulated therefrom and from the various surrounding objects by means of the intervening air, which is an almost absolute non-conductor of electricity. The conductors are insulated from their supports by means of glass or other suitable non-conductor. Subterranean or submarine conductors are insulated by enveloping them in one or more coatings of non-conducting material, usually gutta-percha or paraffine, inclosed in a lead or iron pipe or armor.

When a pulsation of electricity is transmitted through a conductor insulated in the manner above described, a peculiar phenomenon, termed "electrostatic induction," takes place, which is the inevitable accompaniment of the beginning or ending, the increase or decrease of the electric current.

Any conductor through which electric currents flow is necessarily partially or wholly surrounded by other conductors in which induced currents are thus generated. If the whole of a considerable portion of a circuit of conductors of small electrical resistance is very near to a conductor which is traversed by a working-current, and is so situated with reference thereto that the induction tends to occur throughout in one direction, the induced current will be very considerable, and its reaction upon the working-current will also be proportionately great. The effect of this reaction is to diminish, for the time being, the strength of the working-current. If, on the other hand, the circuit in which the induced current flows is situated at a considerable distance from the conductor traversed by the working-current, or if it is only exposed to inductive action for a small portion of its length, or is so situated that the induced current tends to flow in opposite directions in different portions of the circuit, then the induced current will be small and its reaction upon the working-current will also be small. These well-known effects of inductive action constitute very series obstructions to the efficient transmission of telegraphic or telephonic signals, especially in circuits of considerable length. For example, when a conductor is placed within an insulating-coating and is laid underground or under water, the surrounding earth or water constitutes a conductor in which an inductive action is set up, which in turn reacts upon the original current and renders the signals indistinct or confused, the general tendency being to prolong all signals and to obliterate the intervals between successive signals. When two or more insulated conductors are inclosed within a single conduit or otherwise placed parallel and in close proximity to each other, the inductive action of the current in each conductor tends to induce correlative currents simultaneously in all the other parallel conductors, and thus interfere with the correct transmission of signals through them. When the electric telephone is used as a medium of communication this effect becomes especially troublesome, for the reason that communications transmitted through any one of the groups of conductors, may distinctly be heard in an instrument attached to any one of the other conductors.

Various attempts heretofore have been made to obviate this difficulty, one of which attempts consisted in using two insulated conductors parallel to each other, one for the direct and the other for the return conductor of the circuit, this organization being based upon the theory that the inductive action of one conductor would be counteracted by equal and opposite action of like character in the other conductor. Although the effects of inductive action are somewhat diminished under this arrangement they are by no means effectually eliminated, inasmuch as two parallel conductors cannot be so arranged in practice that each can be situated at precisely the same mean distance from all neighboring conductors, from which it results that the inductive action in one portion of a conductor cannot accurately be compensated by the opposite effect in another portion of the other conductor.

My invention is based upon the discovery that if one portion of a circuit be surrounded by the other helically, one portion passing through the mathematical axis of the other, and being properly insulated therefrom, thus forming a solenoid, and either portion be used for a direct and the other portion for the return conductor of the telegraphic or telephonic circuit of any length, induced, derived, or magnetizing currents will be entirely prevented.

Figure 2:
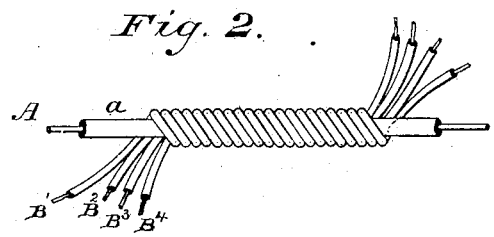
Figure 3:
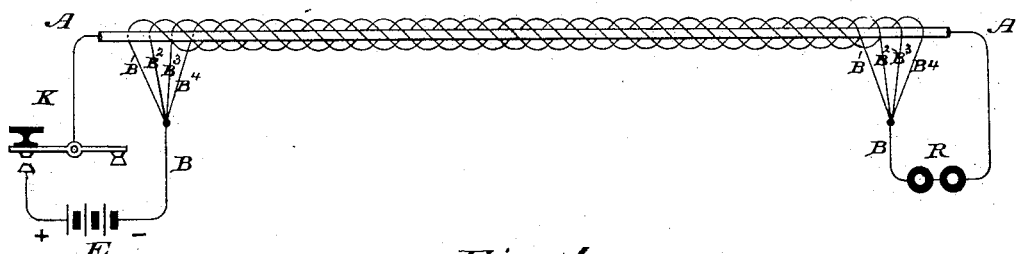

In the accompanying drawings, Figure 1 represents the two portions of a telegraphic or telephonic circuit organized in accordance with the principles of my invention. Fig. 2 shows a modification of the same, which is more suitable for practical use. Fig. 3 is a theoretical diagram, illustrating the application of my invention to a telegraphic circuit; and Fig. 4 in like manner represents its application to a telephonic circuit.

Two metallic conductors, A B, are shown in Fig. 1 as enveloped in the ordinary manner in insulating-coatings $a$ $b$ of suitable material, the insulated conductor B being wound helically and as closely as possible around the conductor A, as shown at C. Where the ends of the conductors are united they form a solenoid.

I make use of the double conductor, constructed as above described, of any desired length for a telegraphic or telephonic circuit.

It will be evident, upon inspection, that the mean distance of the conductors A B from each other will be the same through the entire circuit; and it will also be observed that the mean distance of the conductors from all surrounding objects of whatsoever nature and of whatsoever actual distance therefrom will be precisely the same. It follows, therefore, that as the current in traversing the circuit necessarily flows helically in a given direction through one conductor, and directly in the opposite direction through the other conductor, the inductive effect of the current in each conductor while of opposite character will be precisely equal in amount.

It is obvious that under the organization hereinbefore described the length of the helical conductor necessarily greatly exceeds that of the other; consequently were they of equal conductivity per unit of length, the total resistance of the helical conductor would necessarily be much greater than that of the direct one. Even under these conditions my invention will be operative, and induction will be prevented; but I prefer to have the two conductors of substantially equal resistance.

The resistance of the two conductors could obviously be modified by making the helical one of much larger wire than the other; but such a mode of construction is obviously objectionable for mechanical reasons. I obviate this objection by constructing my improved conductor in the manner shown in Fig. 2, which represents the direct conductor A as enveloped in a compound helix consisting of several parallel conductors, $B'$ $B^2$ $B^3$ $B^4$, which number I have found to be a convenient one in practice, which conductors are of such thickness and electrical conductivity as to render their joint resistance per unit of conductivity, measured on the direct conductor, approximately the same as that of that conductor itself.

Fig. 3 represents an organization of telegraph apparatus preferred by me, which figure shows a battery, E, a transmitting-key, K, a direct axial or central conductor, A, connecting the key with the receiving-instrument R, and four helical conductors, $B'$ $B^2$ $B^3$ $B^4$, connected in multiple arc with the battery and receiver respectively. This organization of apparatus constitutes what would be called, by analogy in other forms of telegraphy, a metallic circuit, either open or closed, according to the normal position of the transmitting-key.

It is obvious that in apparatus thus organized electric currents or pulsations transmitted through one conductor will return through the other, and that the inductive influence of the two sets of conductors both upon each other and upon all surrounding objects will be equal and opposite.

Figure 4:
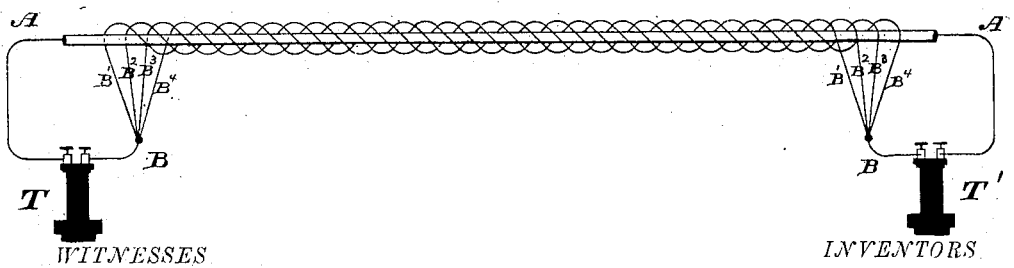

Fig. 4 illustrates a circuit equipped with speaking-telephones T T', arranged upon the same principle as that hereinbefore described. The telephones act both as receivers and transmitters, the circuit necessarily passing through them.

Any required number of independent circuits of conductors, organized as above described, may lie parallel and close together, within a single conduit or pipe, and each conductor will be absolutely protected against the effects of induction, both in itself and in the neighboring conductors, whatever their number or relative position. I am thus enabled to employ one circuit to convey a portion of the current generated by a dynamo-electric machine and employed to transmit power or to supply a series of electric lamps, and to use another circuit for ordinary commercial telegraphy, under either the Morse, the duplex, the quadruplex, or the automatic system of transmission, while still another circuit may be employed for oral transmission by means of speaking-telephones, and any number of such circuits may be inclosed in a single casing without in the slightest degree interfering with each other.

I do not broadly claim herein an electric circuit constituting a solenoid, as this constitutes the subject-matter of another application constituting a division hereof.

I am also aware that it has been proposed to use a closed metallic circuit, consisting of parallel or twisted wires insulated from each other; and I disclaim such organization as differing radically in principle, construction, and function from mine.

I claim as of my own invention—

1. An electric circuit composed of a solenoid the helix of which is of substantially equal resistance with the axis per unit of length of the latter, as described.

2. In combination with the transmitting and receiving devices of an electric telegraphic or telephonic circuit, the line-wire or cable in the form of a solenoid of substantially equal resistance throughout, substantially as and for the purpose described.

3. The combination, substantially as hereinbefore set forth, of a compound electric conductor, consisting of two or more parallel single conductors formed into a helix and united in multiple arc at their extremities, with a single electric conductor placed in the longitudinal axis of said helix, the simple and compound conductors forming, respectively, the direct and return portions of an electric circuit.

4. The combination, substantially as hereinbefore set forth, of an electric conductor in the form of a helix, a second electric conductor placed in the longitudinal axis of the said helix, an apparatus for transmitting electrical pulsations placed between and connected with the respective terminals of said conductors at one station, and an apparatus for producing physical effects by means of electrical pulsations placed between and connected with the respective terminals of said conductors at another station.

In witness whereof I have hereunto subscribed my name this 26th day of January, 1881.

ORAZIO LUGO.

Witnesses:
FRANK L. POPE,
SAMUEL H. M. BARLOW.